United States Patent
Rao et al.

(10) Patent No.: US 6,737,226 B1
(45) Date of Patent: May 18, 2004

(54) PROCESS FOR MAKING POLYESTER PHOTOGRAPHIC FILM BASE AND PHOTOGRAPHIC ELEMENT COMPRISING SAID BASE

(75) Inventors: Yuanqiao Rao, Rochester, NY (US); Jehuda Greener, Rochester, NY (US); Michael R. Brickey, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/279,891

(22) Filed: Oct. 24, 2002

(51) Int. Cl.$^7$ .................. G03C 1/765; G03C 1/795; G03C 11/22; B29C 55/00; B29C 49/08

(52) U.S. Cl. .................. 430/349; 430/496; 430/533; 264/173.15; 264/173.16; 264/210.7; 428/480

(58) Field of Search .................. 430/349, 494, 430/496, 533; 264/173.15, 173.16, 210.7; 428/480

(56) References Cited

U.S. PATENT DOCUMENTS

| | | | |
|---|---|---|---|
| 4,141,735 A | 2/1979 | Schrader et al. ............. | 430/533 |
| 5,034,263 A | 7/1991 | Maier et al. ................. | 428/480 |
| 5,340,907 A | 8/1994 | Yau et al. .................... | 528/274 |
| 5,385,704 A | 1/1995 | Tsou et al. ................ | 264/210.7 |
| 5,385,773 A | 1/1995 | Yau et al. .................... | 528/272 |
| 5,607,826 A | 3/1997 | Tsou et al. ................ | 430/533 |
| 5,759,756 A * | 6/1998 | Laney et al. ................ | 430/533 |
| 5,895,744 A * | 4/1999 | Chen et al. ................ | 430/533 |
| 5,925,507 A | 7/1999 | Massa et al. ................ | 430/533 |
| 6,183,848 B1 | 2/2001 | Turner et al. ................ | 528/176 |
| 6,232,054 B1 | 5/2001 | Okutu et al. ................ | 430/533 |
| 6,558,884 B1 * | 5/2003 | Greener et al. ............. | 430/533 |

* cited by examiner

Primary Examiner—Richard L. Schilling
(74) Attorney, Agent, or Firm—Chris P. Konkol

(57) ABSTRACT

A process for making polyester film base material comprising more than 65 mol % of 1,4-cyclohexanedimethanol (CHDM) of the total glycol component in the polyester material. The film base is prepared by sequentially carrying out the following steps: (a) casting a molten polyester resin in a machine direction onto a casting surface to form a continuous sheet, (b) drafting the sheet by stretching in the machine direction at a stretch ratio of from 2 to 4, and at a temperature ranging from 70° C. to 130° C., (c) tentering the sheet in the transverse direction by stretching at a stretch ratio of from 2 to 4, and at a temperature ranging from 70° C. to 130° C. to obtain a biaxially oriented film, (d) heat-setting the oriented film at an actual temperature of from 160° C. to 200° C., and (e) cooling the heat-set film without substantial detentering to obtain a biaxially oriented, heat-set polyester-based film having a cutting index of 1 to 1.5 and a tensile toughness ranging from 15 to 55 MPa. The invention is also directed towards a silver halide light sensitive photographic element comprising the PET-based film base made by the present process. The photographic film base of the invention exhibits excellent dimensional stability, optical clarity and mechanical strength while also possessing a crystalline morphology that enables finishing by cutting, chopping or perforating techniques at reduced cutting index without requiring a detentering step after heat-setting.

17 Claims, No Drawings

US 6,737,226 B1

PROCESS FOR MAKING POLYESTER PHOTOGRAPHIC FILM BASE AND PHOTOGRAPHIC ELEMENT COMPRISING SAID BASE

FIELD OF THE INVENTION

This invention relates to a process for making a polyester photographic film base having improved properties. More particularly, the invention relates to a process involving heat-setting a biaxially stretched CHDM-containing PET-based photographic film base having improved properties with regard to cutting, chopping, and perforating.

BACKGROUND OF THE INVENTION

Poly(ethylene terephthalate) (PET) films exhibit excellent properties for use as photographic film base with regard to transparency, dimensional stability, mechanical strength, and resistance to thermal deformation. However, PET films are extremely tough and not well suited for finishing operations, i.e., slitting, chopping, and perforating processes, which are required in the preparation of photographic films. Moreover, such films are not well suited for cutting processes in various photofinishing steps such as notching, splicing, and sleeving.

Several polyester-based materials with improved cutting characteristics were proposed for use as photographic film base materials in commonly assigned copending U.S. Ser. No. 10/036,668, now U.S. Pat. No. 6,558,884, and U.S. Ser. No. 10/027,023, now U.S. Pat. No. 6,555,303, hereby incorporated by reference in their entirety. This improvement was accomplished through incorporation of 1,4-cyclohexane dimethanol (CHDM) either by copolymerization as a glycol comonomer or by blending with CHDM-containing copolyesters. Although significant improvement in cutting performance has been shown with these PET-modified polyesters, further improvement may be needed to meet the stringent requirements of certain cutting steps in photofinishing operations.

The process for making a polyester-based photographic film base typically comprises the steps of casting a molten polyester resin in a machine direction onto a casting surface to form a continuous sheet, drafting the sheet by stretching in the machine direction, tentering the sheet by stretching in the transverse direction, heat-setting the drafted and tentered sheet, and cooling the heat-set sheet to form a stretched, heat-set film, such as described in, e.g., U.S. Pat. No. 4,141,735, the disclosure of which is incorporated by reference herein. U.S. Pat. Nos. 5,385,704 and 5,607,826 disclose a method for improving the finishing characteristics of photographic materials employing a PET film base involving lowering the planar birefringence of the film base to below 0.150 by performing a detentering step which allows the tentered film to shrink in width by 2 to 20% (pref. 10–18%) after the heat-setting step during film manufacturing. Improvement in finishing characteristics of PET-based photographic film, as manifested by decrease in dirt and debris generated during finishing operations, is also disclosed in U.S. Pat. No. 6,228,569 and U.S. Ser. No. 09/223, 876 hereby incorporated by reference in their entirety. These latter inventions disclose a method utilizing relatively high heat-set temperatures (>220° C.) applied during the film manufacturing process, which substantially improves the finishing and cutting characteristics of PET-based photographic supports. However, even with the demonstrated improvements in finishability, the PET-based film is still difficult to cut in various steps of the photofinishing process. Furthermore, applying this method to the manufacture of high-CHDM PET-based photographic film base does not provide the desired improvement in cutting and finishing characteristics. Therefore, a clear need exists to further improve the cutting characteristics of high-CHDM PET-based photographic supports.

U.S. Pat. No. 5,034,263 to Maier et al. disclosed a laminated film comprising a PET core and, on at least one surface thereof, an overcoat of a poly(1,4-cyclohexylene dimethylene terephthalate) polyester, in order to allow the laminated film to be readily slit and perforated using techniques commonly employed with consumer photographic film. Maier et al. states that the CHDM component should comprise at least 70 mol % of the glycol component of the polyester. However, such laminates have been found prone to delamination.

U.S. Pat. No. 5,925,507 to Massa et al. discloses a PET film-base material having less tendency to core set, comprising polyester containing at least 30 weight % CHDM, which polyester is blended with a polycarbonate that contains bisphenol. U.S. Pat. No. 4,141,735 to Schrader et al. discloses a polyester film base having improved core-set curl, involving the use of heat tempering, in one example using poly(1,4-cyclohexylene dimethylene terephthalate). However, this polymer crystallizes rapidly, therefore, the making of its oriented film is difficult. Also, the polymer becomes opaque or hazy and useless for photographic applications where transparency is required.

The blending or copolymerizing of conventional polyester with other polyester constituents, in order to improve the cutting performance of a film, has also been proposed for poly(ethylene naphthalate) (PEN)-based polyester films, as disclosed in U.S. Pat. No. 6,232,054 B1 to Okutu et al. However, PEN is generally considerably more costly and more difficult to manufacture than PET, so a clear need exists for improving the cuttability of PET-based polyester supports.

Outside the photographic field, PET and PEN are valuable commercial semi-crystalline polyesters, which are widely used for packaging materials due to the combination of desirable properties that they possess. The high oxygen barrier properties of these polyesters render them particularly valuable for packaging oxygen-sensitive food and other goods and materials. PEN has advantages over PET due to its higher Tg and higher oxygen barrier properties, although PEN, as mentioned above, is considerably more costly and is somewhat harder to process than PET.

The toughness and cutting difficulty of PET and similar polyesters is generally attributed to the crystal structure and molecular orientation of the film. It is known that changes in these factors, driven either by formulary changes or by modified process conditions, can be used to lower the toughness and improve the cutting performance of PET. Generally, the crystallinity of PET can be lowered or altogether eliminated by adding suitable crystallization modifiers. Crystallization modifiers like isophthalic acid (IPA) and CHDM are often copolymerized into PET and PEN polyesters to form copolyesters that have better processing properties. Modest levels of IPA slow down crystallization and raise the oxygen barrier properties. Higher levels of IPA break up crystallinity and lead to amorphous copolyesters with good barrier properties, but these copolyesters, are known to those skilled in the art, to possess poor impact and other mechanical properties. Modest levels of CHDM also slow down crystallization, but decrease oxygen barrier properties. Higher levels of CHDM are well known to form families of amorphous copolyesters, which are widely used in commerce in a multitude of applications including heavy gauge sheet, signage, medical packages, etc. These copolyesters have excellent impact resistance and other mechanical properties, but have lower oxygen barrier properties than IPA-modified copolyesters and lower oxygen barrier properties than PET.

Photographic film requires a strict control of the thickness uniformity and surface flatness. One method of control is through stretching of a polymer sheet into a semi-crystalline state. For CHDM-modified polyester, only when the concentration of CHDM-comonomer units relative to total glycol content is less than about 30 mol % or greater than about 65 mol % is the resulting polyester crystalline. For materials in which the content is less than about 30 mol %, however, the material does not become sufficiently crystalline for dimensional stability and thickness uniformity until the concentration of CHDM comonomer relative to total glycol content is less than 25 mol %. Amorphous polyester film or insufficiently crystalline film presents dimensional stability and thickness uniformity problems, and it possesses relatively low stiffness.

Amorphous copolyesters are generally defined as copolyesters that do not show a substantial melting point by differential scanning calorimetry (DSC). These copolyesters are typically based on terephthalic acid, IPA, ethylene glycol, neopentyl glycol and CHDM. It is known that amorphous copolyesters possess a combination of desirable properties, such as excellent clarity and color, toughness, chemical resistance and ease of processing. Accordingly, such copolyesters are known to be useful for the manufacture of extruded sheets, packaging materials, and parts for medical devices. For example, U.S. Pat. Nos. 5,385,773 and 5,340,907 to Yau et al. disclose polyesters of CHDM in an amount of 10–95 mol % of the glycol component, and a process for producing such copolymers by esterification. U.S. Pat. No. 6,183,848 B1 to Turner et al. discloses an amorphous copolyester comprising various amounts of comonomers derived from CHDM which, because of improved gas barrier properties, are useful for packaging perishable goods. In one embodiment, the copolyester is disclosed as a biaxially oriented sheet.

PROBLEM TO BE SOLVED BY THE INVENTION

Accordingly, it would be desirable to provide a PET-based film base with improved physical properties. In particular, it would be desirable to obtain a PET-based film base that is less tough and better suited for finishing operations, i.e., slitting, chopping, and perforating processes, which are required in the preparation of photographic films. Moreover, it would be desirable to obtain a PET-based film base that is easier to cut in various steps of the photofinishing process, such as splicing, notching, and sleeving. Additionally, it would be desirable to be able to use PET-based polyester film as a film base in certain consumer photographic film applications and in films processed in a minilab setting. It would also be desirable for such a PET-based film base to have other advantageous properties such as dimensional stability and a reduced tendency to take up high levels of curl during storage in cartridges at high temperatures and/or is better able to lower this curl during photoprocessing.

SUMMARY OF THE INVENTION

The invention provides an improved method of making a polyester photographic film base having excellent dimensional stability, optical clarity and mechanical strength while also possessing a crystalline morphology that enables finishing by cutting, chopping, or perforating techniques at reduced cutting index. This is achieved by controlling the base-making process to produce a biaxially oriented high-CHDM PET-based film having actual heat-set temperature of under 200° C. In accordance with one embodiment of the invention, the film base is prepared by sequentially carrying out the following steps: (a) casting a molten polyester resin onto a casting surface to form a continuous sheet in a machine direction, (b) draffing the sheet by stretching in the machine direction at a stretch ratio of from 2 to 4, and at a temperature ranging from 80 to 130° C., (c) tentering the sheet in a transverse direction by stretching at a stretch ratio of from 2 to 4, and at a temperature ranging from 80 to 130° C., (d) heat-setting the tentered sheet at an actual temperature sensed by the sheet of from 160 to 200° C., and (e) cooling the heat-set sheet without substantial detentering to obtain a stretched, heat-set polyester-based film having a cutting index of 1 to 1.5 and tensile toughness of less than 55 MPa.

The actual heat-set temperature of the film may be determined from a secondary melting endothermic peak of a DSC thermogram for the film.

A further embodiment of the invention is directed towards a method of making a photographic element comprising at least one light sensitive silver halide-containing emulsion layer and a high-CHDM PET-based film base produced in accordance with the above embodiments.

DETAILED DESCRIPTION OF THE INVENTION

Definitions of terms, as used herein, include the following:

In the present invention, monomeric units derived from 1,4-cyclohexane dimethanol (CHDM) are also referred to as "CHDM repeat units" or "CHDM-comonomer units" or "CHDM."

By "terephthalic acid," suitable synthetic equivalents, such as dimethyl terephthalate, are included. It should be understood that "dicarboxylic acids" includes the corresponding acid anhydrides, esters and acid chlorides for these acids. Regarding the glycol component or acid component in a polymer or material, the mol percentages referred to herein equal to a total of 100 mol %.

"PET," "PET polymer," "PET resin," "poly(ethylene terephthalate) resin," and the like refers to a polyester comprising at least 98 mol % terephthalic acid comonomer units, based on the total acid component, and comprising at least 98 mol % of ethylene glycol comonomer units, based on the total glycol component. This includes PET resins consisting essentially of about 100 mol % terephthalic acid comonomer units, based on the total acid component, and consisting essentially of about 100 mol % of ethylene glycol comonomer units, based on the total glycol component.

The term "modified PET polymer," "modified PET resin," or the like is a polyester comprising at least 70 mol % terephthalic acid comonomer units, based on the total acid component, that has been modified so that either the acid component is less than 98 mol % of terephthalic acid ("TA") comonomer units or the glycol component is less than 98 mol % of ethylene glycol ("EG") comonomer units, or both the TA and EG comonomer units are in an amount less than 98 mol %. The modified PET polymer is modified with, or copolymerized with, one or more comonomers other than terephthalic acid comonomers and/or ethylene glycol comonomers in an amount of greater than 2 mol % (including greater than 5 mol %), of either the acid component and/or the glycol component, for example, to improve the cuttability of a film base or otherwise change the properties of the film base in which it is used. The "modified PET resin" does not necessarily need to contain any ethylene glycol comonomer units, and it does not necessarily need to contain any acid component other than terephthalic acid comonomer units.

In one embodiment, the modified PET polymer is a polyester comprising at least 80 mol % terephthalic acid comonomer units, based on the total acid component, and at least 35 mol % ethylene glycol comonomer units, further modified with or copolymerized with one or more additional types of comonomers, preferably in the amount of greater than 5 mol % of the acid component and/or glycol component.

The term "CHDM-modified PET" or "CHDM-modified-PET polyester" refers to a modified PET polymer modified by the inclusion of at least 3.5 mol % CHDM comonomer units, based on the total glycol component.

Similarly, the term "CHDM-modified polyester" refers to a polyester comprising at least 3.5 mol % CHDM comonomer units, based on total glycol component, but not necessarily comprising any specific amount of terephthalic acid component.

The term "high-CHDM-modified PET" refers to a CHDM-modified PET polyester in which the level of CHDM comonomer units is equal to or greater than 65 mol %, based on the total glycol component. This includes both "PCT" (polycyclohexylene dimethylene terephthalate) and "PCTA," which is a copolymer of three monomers: terephthalic acid, isophthalic acid and CHDM, with 100 mol % of the CHDM, based on its total glycol component.

"PET-based polyester material" is a semi-crystalline material comprising one or more polymers wherein at least 70 % by weight of the material is one or more polymers that are either a PET polymer or modified PET polymer. Optionally, the material may also include addenda such as silica beads, plasticizers, and the like. The addenda may include inorganic particles, which can be larger than, but may have at least one dimension describing particle size ranging from 0.1 to 100 nm.

A film base is made using a PET-based polyester material in the present invention. In one embodiment, preferably greater than 80% by weight, more preferably greater than 90% by weight, of the PET-based polyester material used in this invention are one or more polymers that are a high-CHDM PET-based polyester or a CHDM-modified PET polyester.

The film base comprising said materials may be manufactured by a process of casting, biaxial stretching and heat-setting. The process for making PET-based film base typically comprises the steps of casting a molten PET-based polyester resin onto a casting surface to form a continuous sheet along a machine direction, drafting the sheet by stretching in the machine direction, tentering the sheet by stretching in a transverse direction, heat-setting the drafted and tentered sheet, and cooling the heat-set sheet to form a stretched, heat-set polyester film, such as described in, e.g., U.S. Pat. No. 4,141,735 to Schrader et al., the disclosure of which is incorporated in its entirety by reference herein. Alternately, the stretching of the film in the machine and transverse directions can be performed simultaneously using appropriate machinery.

Preferably, in order to improve its dimensional stability, the multilayer film base is heat treated at temperatures from Tg −50° C. up to Tg for times ranging from 1 hr to 1000 hrs, where Tg is the glass transition temperature of the polyester material.

In one particular embodiment, the process for preparing films from the resin compositions of this invention comprises the following steps:

(1) The resin is cast under molten conditions upon a cooling surface to form a continuous cast sheet. Preferably, the molten polyester resin has an inherent viscosity of from 0.5 to 0.8 dl/g, and is cast at a temperature of from 250 to 310° C. while the casting surface has a temperature of from 40 to 70° C. The inherent viscosity (IV) is measured at 25° C. in a solvent mixture of phenol/chlorobenzene (60/40 by weight) at a concentration of 0.25 g/dl with an Ubbelhode glass viscometer.

(2) The continuous sheet is removed from the casting surface and passed into a drafting zone where it is first preheated and then stretched in the machine direction at a stretch ratio of 2.0 to 4.0, at a temperature of from about 80° C. to 110° C. The drafting zone typically includes two sets of nipped rollers, the first being the entrance to the drafting zone and the second is the exit from the drafting zone. To achieve the stretch ratios necessary for the practice of this invention, the exit nip rollers are rotated at a speed greater than the entrance nip rollers. The film may be cooled in the last stage of the drafting zone to 25° C. to 40° C.

(3) The film moves from the drafting zone into a tentering zone where it is preheated and stretched in the transverse direction at a stretch ratio of 2.0 to 4.0, at a temperature of from about 80° C. to 115° C. The tentering zone typically includes a means for engaging the film at its edges and stretching such that the final width is from 2.0 to 4.0 times that of the original width.

(4) The film is next heat-set by maintaining it at a temperature of at least 160° C., preferably at least 160° C. to 180° C., while being constrained as in the tentering zone for a time sufficient to affect heat-setting. Times longer than necessary to bring about this result are not detrimental to the film; however, longer times are undesirable as the lengthening of the zone requires higher capital expenditure without achieving additional advantage. The heat-setting step is typically accomplished within a time period of 0.1 to 15 seconds and preferably 0.1 to 10 seconds. Finally, the film is cooled without substantial detentering (the means for holding the edges of the film do not permit greater than 2% shrinkage thereof).

The actual temperature sensed by the film during the heat-setting step ("actual heat-set temperature") may be determined by the DSC technique. The DSC heat-set temperature represents the actual heat-set temperature. The actual temperature sensed by the film is often different from the set heat-set temperature applied in the process due to heat transfer inefficiencies, and it sometimes depends on the position of the material sample across the web. The DSC heat-set temperature may be determined by scanning a test sample (as-received) by a conventional DSC apparatus (e.g., DuPont 990 Thermal Analyzer) at a rate of 10° C./min from ambient to approximately 300° C. The thermogram produced by the scan will contain two distinct endothermic peaks: (1) a high temperature peak ranging from 240 to 280° C., which represents the primary melting range of the PET-based polyester; and (2) a much smaller peak detected at a lower temperature for films heat-set under temperatures between the glass transition and the primary melting transition for the material. The position of this secondary melting peak is closely dependent on the beat-set temperature applied in the process and it represents the actual temperature sensed by the material in the heat-set section of the film-making machine.

Photographic film requires a strict control of the thickness uniformity and surface flatness. One method of control is through stretching of a polymer sheet into a semi-crystalline state. Typically, biaxially stretching the material causes amorphous material to become semi-crystalline. In a typical embodiment, the crystallinity is at least 10%. For CHDM-modified polyesters, only when the concentration of CHDM comonomer units relative to the total glycol content is less than about 30 mol % or greater than about 65 mol % is the resulting polyester crystalline. For materials in which the content is less than about 30 mol %, however, the material does not become sufficiently crystalline for dimensional stability and thickness uniformity until the concentration of CHDM comonomer relative to the total glycol content is less than 25 mol %. Amorphous polyester film or insufficiently crystalline film presents dimensional stability and thickness uniformity problems, and it possesses relatively low stiffness.

In one embodiment of the invention, the high-CHDM-modified PET polyesters used in the film base comprise copolyesters having a dicarboxylic acid component and a glycol component, the dicarboxylic acid component comprising repeat units from at least 80 mol % terephthalic acid (or its ester) and the glycol component comprising at least 65 mol %, preferably more than 75 mol %, of repeat units from CHDM and from about 0 to 35 mol % from another glycol, preferably from 0 to 25 mol % from ethylene glycol.

The high-CHDM-modified PET polyesters used in making the articles of this invention preferably have about 100 mol % of a dicarboxylic acid portion and about 100 mol % of a glycol portion. Less than about 30 mol %, preferably not more than about 20 mol % of the dicarboxylic acid repeat units may be from conventional acids other than terephthalic acid such as those selected from succinic, glutaric, adipic, azelaic, sebacic, fumaric, maleic, itaconic, 1,4-cyclohexanedicarboxylic, phthalic, isophthalic, and naphthalene dicarboxylic acid.

Preferably, the glycol component of the high-CHDM-modified-PET polyesters contains repeat units comprising from 65 to 100 mol % of CHDM and from about 0 to 35 mol % of ethylene glycol, based on the total glycol component. The glycol component may optionally include less than 35 mol %, preferably not more than about 10 mol % of other conventional glycols such as propylene glycol, 1,3-propanediol; 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, neopentyl glycol, 1,5-pentanediol, 1,6-hexanediol, 1,8-octanediol, 2,2,4-trimethyl-1,6-hexanediol, thiodiethanol, 1,2-cyclohexanedimethanol, 1,3-cyclohexanedimethanol, 2,2,4,4-tetramethyl-1,3-cyclobutanediol and the like.

In one embodiment, a preferred high-CHDM-modified PET for use in the present invention is represented by the following structure:

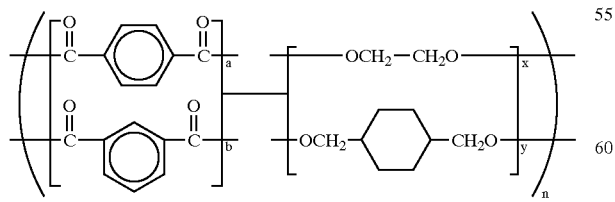

In Structure (I) above, the subscripts 'a' and 'b' represent the mol %, based on the total acid component of the copolyester. Preferably, as indicated above, 'a' is 70 to 95 mol % and b is between 5 to 30 mol %; the subscripts x and y represent the mol %, based on the total glycol component of the copolyester. Preferably, as indicated above, x is 0 to 35 mol % and y is between 65 and 100 mol %.

In the case of embodiments involving blends, a blend comprising at least one high-CHDM-modified PET polymer blended with a suitable CHDM-modified polyester, such that the total content of the CHDM-comonomer units in the blend is 65 to 100 mol %, preferably at least 75 mol %, more preferably at least 85 mol %, based on the total glycol component. In the CHDM-modified polyester, any of the above-mentioned acid components may be used and any of the above glycol components may be used in addition to the CHDM component.

In accordance with one embodiment of the invention, a high CHDM-modified PET resin is used to prepare a biaxially stretched and heat-set film or sheet material under conditions as described above. In another embodiment of this invention, a CHDM-modified PET resin is blended using a suitable compounding method with a high CHDM-modified PET resin at a sufficient level, and this blend is then used to prepare a biaxially stretched and heat-set film or sheet material under conditions as described above.

More particularly, the film base used in the present invention comprises a PET-based polyester material comprising one or more polyester resins, in which material the level of repeat units derived from CHDM, based on the total glycol component, is 65 to 100 mol %, and the level of repeat units derived from an acid component other than terephthalic acid or its ester is in the amount of 5 to 30 mol %, preferably 10 to 20, based on the total acid component, and wherein the cutting index of the film base as defined below is preferably in the range 1.0 to 1.5, optimally in the range 1 to 1.3, and the tensile toughness is in the range 15 to 55 MPa. Preferably, the film base comprises a material in which the level of repeat units derived from CHDM is 85 mol % or greater, based on the total glycol component in the material. Also, preferably, less than 25 mol % of the total glycol units is aromatic.

The acid component other than terephthalic acid can be, for example, isophthalic acid (IPA), dimethyl isophthalate, 1,4-cyclohexanedicarboxylic acid (1,4-CHDA), 1,4 cyclohexanediacetic acid, diphenyl-4,4-dicarboxylic acid, dimethyl-2,6-naphthalene-dicarboxylate, succinic acid, glutaric acid, adipic acid, azelaic acid, sebacic acid, paraphenylenedicarboxylic acid (PPDA), naphthalenedicarboxylic acid (NDA), and mixtures thereof. Preferably, the other acid component is IPA, 1,4-CHDA, PPDA, NDA, and the like, and mixtures thereof.

In one embodiment, the film base used in the present invention comprises a high-CHDM modified PET-based polyester material with the following chemical structure:

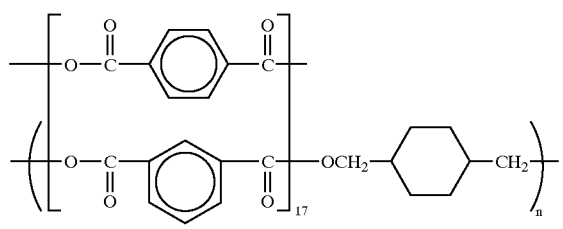

In another embodiment, the film base used in the present invention comprises a blend comprising a poly(cyclohexane dimethylene terephthalate) (PCT) polymer and a CHDM-modified polymer in the ratio of 95:5 to 30:70, more preferably 95:5 to 80:20. Preferably, the level of the CHDM comonomer units in the CHDM-modified polymer is 50 to 100 mol %, based on the total glycol component. All polyester materials in the blend must be miscible, that is, the film produced from said blend must be optically clear to meet the stringent optical requirements of high transparency and low haze placed on photographic film bases.

Both of the polyester and the copolymerized polyester to be used in the support for a photographic material of the present invention may contain phosphoric acid, phosphorous acid and esters thereof, and inorganic particles (e.g. silica, kaolin, calcium carbonate, calcium phosphate and titanium dioxide) during polymerization, and inorganic particles may be blended with the polymer after polymerization. The inorganic particles can be larger than, but may have at least one dimension ranging from 0.1 to 100 nm. A dye, a UV absorber or an antioxidant may also be suitably added at any stage during polymerization and after polymerization. As indicated above, the film base is useful in a photographic element comprising at least one silver-halide imaging layer over a support comprising said film base of the present invention. Such a photographic element can be a photographic film or a photothermographic film.

In addition to the PET-based layer made according to the present invention, the support can further comprise one or more photographically acceptable subbing layers, backing layers, tie layers, magnetic layers, and the like.

Subbing layers are used for the purpose of providing an adhesive force between the polyester support and an overlying photographic emulsion comprising a binder such as gelatin, because a polyester film is of a very strongly hydrophobic nature and the emulsion is a hydrophilic colloid. If the adhesion between the photographic layers and the support is insufficient, several practical problems arise such as delamination of the photographic layers from the support at the cut edges of the photographic material, which can generate many small fragments of chipped-off emulsion layers, which then cause spot defects in the imaging areas of the photographic material.

Various subbing processes and materials have, therefore, been used or proposed in order to produce improved adhesion between the support film and the hydrophilic colloid layer. For example, a photographic support may be initially treated with an adhesion promoting agent such as, for example, one containing at least one of resorcinol, catechol, pyrogallol, 1-naphthol, 2,4-dinitrophenol, 2,4,6-trinitrophenol, 4-chlororesorcinol, 2,4-dihydroxy toluene, 1,3-naphthalenediol, 1,6-naphthalenediol, acrylic acid, sodium salt of 1-naphthol-4-sulfonic acid, benzyl alcohol, trichloroacetic acid, dichloroacetic acid, o-hydroxybenzotrifluoride, m-hydroxybenzotrifluoride, o-fluorophenol, m-fluorophenol, p-fluorophenol, chloralhydrate, and p-chloro-m-cresol. Polymers are also known and used in the subbing layer for promoting adhesion between a support and an emulsion layer. Examples of suitable polymers for this purpose are disclosed in U.S. Pat. Nos. 2,627,088; 2,968,241; 2,764,520; 2,864,755; 2,864,756; 2,972,534; 3,057,792; 3,071,466; 3,072,483; 3,143,421; 3,145,105; 3,145,242; 3,360,448; 3,376,208; 3,462,335; 3,475,193; 3,501,301; 3,944,699; 4,087,574; 4,098,952; 4,363,872; 4,394,442; 4,689,359; 4,857,396; British Patent Nos. 788,365; 804,005; 891,469; and European Patent No. 035,614. Often these include polymers of monomers having polar groups in the molecule such as carboxyl, carbonyl, hydroxy, sulfo, amino, amido, epoxy, or acid anhydride groups, for example, acrylic acid, sodium acrylate, methacrylic acid, itaconic acid, crotonic acid, sorbic acid, itaconic anhydride, maleic anhydride, cinnamic acid, methyl vinyl ketone, hydroxyethyl acrylate, hydroxyethyl methacrylate, hydroxychloropropyl methacrylate, hydroxybutyl acrylate, vinylsulfonic acid, potassium vinylbenezensulfonate, acrylamide, N-methylamide, N-methylacrylamide, acryloylmorpholine, dimethylmethacrylamide, N-t-butylacrylamide, diacetonacrylamide, vinylpyrrolidone, glycidyl acrylate, or glycidylmethacrylate, or copolymers of the above monomers with other copolymerizable monomers. Additional examples are polymers of, for example, acrylic acid esters such as ethyl acrylate or butyl acrylate, methacrylic acid esters such as methyl methacrylate or ethyl methacrylate or copolymers of these monomers with other vinylic monomers; or copolymers of polycarboxylic acids such as itaconic acid, itaconic anhydride, maleic acid or maleic anhydride with vinylic monomers such as styrene, vinyl chloride, vinylidene chloride or butadiene, or trimers of these monomers with other ethylenically unsaturated monomers. Materials used in adhesion-promoting layers often comprise a copolymer containing a chloride group such as vinylidene chloride. The PET-based polyester material comprising the film base of the present invention can be made by conventional synthetic processes. In general, as is well known by the skilled artisan, polyesters comprise the reaction product of at least one dicarboxylic acid and at least one glycol component. The dicarboxylic acid component can typically comprise residues of terephthalic acid, isophthalic acid, 1,4-cyclohexanedicarboxylic acid, 2,6-naphthalenedicarboxylic acid, and/or mixtures thereof. Also suitable are the anhydrides thereof, acid chlorides thereof, and lower, e.g., C1–C8 alkyl esters thereof. Any isomers of the dicarboxylic acid component or mixtures thereof may be used. For example, cis, trans, or cis/trans mixtures of 1,4-cyclohexanedicarboxylic acid may be employed. Examples of suitable naphthalene dicarboxylic acid isomers include 1,4-naphthalenedicarboxylic acid, 2-6-naphthalenedicarboxylic acid, 2,7-naphthalenedicarboxylic acid, or mixtures thereof.

The polyester polymers used in the present invention can be prepared by a process comprising reacting the dicarboxylic acid component and the glycol component at temperatures sufficient to effect esterification or ester exchange and polycondensing the reaction product under an absolute pressure of less than 10 mm Hg for a time of less than about 2 hours in the presence of a catalyst and inhibitor system. An example of a preferred catalyst and inhibitor system is about 0–75 ppm Mn, about 50–150 ppm Zn, about 5–200 ppm Ge, about 5–20 ppm Ti and about 10–80 ppm P, all parts by weight based on the weight of the copolyester.

Either dimethyl terephthalate (or other lower dialkyl terephthalate ester) or terephthalic acid can be used in producing the copolyester. Thus, the term "terephthalic acid component, monomer, repeat unit, or portion" herein is meant to include either the acid or ester form. These materials are commercially available. The glycols CHDM and ethylene glycol are also commercially available. Either the cis or trans isomer of CHDM, or mixture thereof, may be used in accordance with the present invention.

Generally, the copolyesters may be produced using conventional polyesterification procedures described, for example, in U.S. Pat. Nos. 3,305,604 and 2,901,460, the disclosures of which are incorporated herein by reference. The amorphous or semi-crystalline copolyesters according to the invention are prepared by conventional polymerization processes known in the art, such as disclosed by U.S. Pat. Nos. 4,093,603 and 5,681,918, the disclosures of which are herein incorporated by reference. Examples of polycondensation processes useful in making the modified-PET material of the present invention include melt phase processes conducted with the introduction of an inert gas stream, such as nitrogen, to shift the equilibrium and advance to high molecular weight or the more conventional vacuum melt phase polycondensation, at temperatures ranging from about 240° C. to about 300° C. or higher which are practiced commercially. Although not required, conventional additives may be added to the copolyester materials of the invention in typical amounts. Such additives include pigments, colorants, stabilizers, antioxidants, extrusion aids, slip agents, carbon black, flame-retardants and mixtures thereof.

Various modified-PET polyesters comprising repeat units from CHDM, which can be used in the present invention, are commercially available from Eastman Chemical Company (Kingsport, Tenn.) under the trademark EASTAPAK and EASTAR copolyester, as described at http://www.eastman.com.

Photographic elements of this invention can have the structures and components shown in *Research Disclosure*, Vol. 370, No. 37038 (Feb. 1996) and can be imagewise exposed and processed using known techniques and compositions, including those described in the Research Disclosure No. 37038 cited above.

With regard to cuttability, it is generally known in the art of sheet material cutting that the cutting process combines crack formation and propagation. To form a crack, one needs to apply cutters to cause tension on the surfaces of the sheet material until the material is deformed and its break point is reached. Once the material's break point is reached, a crack would be formed, which starts the second stage of cutting—crack propagation. One can maintain and eventually complete the cutting process by straining the sheet material further using the cutters. Eventually, the cutting would be completed as cracks propagate through the sheet thickness.

To evaluate the cuttability of a given material, one needs to evaluate how the material behaves during the crack formation and propagation stages. If the material absorbs and dissipates more mechanical energy during the crack formation and propagation processes, it is said to be more difficult to cut and will have a poorer cuttability. Two standard tests can be used to evaluate how much mechanical energy a material absorbs and dissipates during the said crack formation and propagation steps. One is the tensile test (ASTM D882) and the other is the tear test (ASTM D1938). The former can be used to evaluate the crack formation part of the cutting process, and the latter can be used to assess the crack propagation part of the cutting process.

The mechanical and cutting properties of the polyester films of the present invention were evaluated in accordance with the following procedures:

Tensile Properties: Modulus and tensile toughness can be determined using a tensile test such as that described in ASTM D882-80a. A tensile test consists of pulling a sample of material with a tensile load at a specified rate until it breaks. From the load and elongation history, a stress-strain curve is obtained with the strain being plotted on the x-axis and stress on the y-axis. The modulus is defined as the slope of the initial linear portion of the stress-strain curve. The modulus is a measure of the stiffness of the material. The tensile toughness is defined as the area under the entire stress-strain curve up to the fracture point. The tensile toughness is a measure of the ability of a material to absorb energy in a tensile deformation. Both modulus and tensile toughness are fundamental mechanical properties of the material.

Tear Strength: The resistance to tear can be determined using a tear test such as that described in ASTM D1938. The test measures the force to propagate tearing in a fracture mode III. The test sample used has a rectangular shape and a sharp long cut in the middle. The separated two arms are then fixed in a conventional tensile testing machine. The fixtures move at constant crosshead speed to prolong the preexisting cut and the steady state force of tearing is recorded.

Cutting Index: It is generally known that tensile toughness represents the energy required to initiate a crack, while fracture toughness determines the energy needed to further propagate the crack. As typical cutting processes involve both crack initiation and crack propagation, a quantity of cuttability can be defined based on these two fundamental material quantities. Tensile toughness can be evaluated through tensile testing. Fracture toughness $G_c$ can be calculated from the tear strength:

$$G_c = 2P_c/b \tag{1}$$

where $P_c$ is the load at tear crack growth and b is the specimen thickness. (See Rivlin, R. S. & Thomas, A. G., (1953), J. Polym. Sci., 10, 291).

For practical simplicity, a dimensionless quantity of cutting index is defined as follows, $$C = 0.5*W_t/W_{tr} + 0.5*G_c/G_{cr} \tag{2}$$

where C is the cutting index, $W_t$ is tensile toughness and $G_c$ is fracture toughness, and $W_{tr}$ and $G_{cr}$ are the corresponding properties of a reference material, where conventional cellulose triacetate (CTA) film is selected as the reference material of this invention. The cutting indices of commonly used film base materials such as PET, PEN and CTA correspond well to their practical cutting performance. Generally, it is desirable for C to be close to 1 (CTA value).

The polyester films having the properties set forth above and prepared by the process described above are less likely to fail and more likely to produce cleaner cut surfaces in various cutting operations. In fact, the films prepared in accordance with this invention compare favorably with CTA, which has been the traditional film base of choice in the photographic industry because of its special physical characteristics.

The present invention is described in detail below by referring to the Examples. However, the present invention should not be construed as being limited thereto.

EXAMPLES

Materials:

The polymer films described in the following examples are prepared using a commercial polyester resin with the trade name of EASTAR A150 (Trademark of Eastman Chemical Company, USA). The material is a copolymer of poly(cyclohexane dimethylene isophthalate) and poly (cyclohexane dimethylene terephthalate) and it comprises approximately 17 mol % of isophthalic diacid in its acid component and 100 mol % of CHDM comonomer in its glycol component.

Physical Property Evaluation:

The physical properties of the films prepared in the Examples below were evaluated as follows:

Tensile Toughness: All tests were performed in accordance with ASTM D 882-80a in a standard environment of 50% RH and 23° C. The tensile test is conducted using a Sintech®2 mechanical testing system with Testworks® version 4.5 software. The specimen size is 1.5 cm wide by 10.2 cm long (gauge length). The crosshead speed is 5.1 cm/min. Five specimens are tested per film sample. The reported tensile toughness is the area under the stress-strain curve.

Tear Strength: All tear tests were performed in accordance with ASTM D1938 in a standard environment of 50% RH and 23° C. The tear test is conducted using a Sintech®2 mechanical testing system with Testworks® version 4.5 software. The specimen size is 2.5 cm wide by 7.6 cm long. A 2.5 cm long cut is first made in the specimen at the center of the width using a pair of sharp scissors, creating two distinct arms. The arms are placed between two flat-faced grips of the mechanical test frame and stretched apart. The crosshead speed is 25 cm/min. The tear strength is reported by normalizing the average peak load by the thickness of the film.

Example 1

Eastar® A150 resin was converted into film using the process of melt extrusion, drafting, tentering, and heat-setting steps. The resin was extruded through a sheet-forming die at a temperature of 277° C. and cast onto a cooling surface at 60° C. to form a continuous cast sheet. The sheet was drafted and tentered at temperatures of 100° C. and 110° C., respectively. The cast sheet was stretched to 3.4 times its original dimensions in both the machine and transverse directions and immediately following stretching, the film was heat-set at an actual temperature of 170° C. for approximately 10 sec. The tensile toughness and the tear strength of the film were measured in accordance with procedures as described above. The cutting index was determined according to Equation 2. The results are shown in Table 1.

Examples 2–4

Films of Eastar® A150 resin were produced in the same manner as described in Example 1 but the actual heat-set temperatures were set at the following values: 175, 176, and 191° C. for Examples 2–4, respectively. The tensile toughness and the tear strength of the corresponding films were measured as described above. The cutting index was determined according to Equation 2. The results are shown in Table 1.

Comparative Examples 1–4

In comparative Examples 1–4, Eastar® A150 resin is converted into film in the same manner as described in Example 1 except that the films were heat-set at the following temperatures: 150° C., 204° C., 220° C., and 240° C. for Comparative Examples 1–4, respectively. The tensile toughness and the tear strength of the film were measured as described above and the cutting index was determined according to Equation 2. The results are shown in Table 1.

Comparative Example 5

Comparative Example 5 is a conventional cellulose triacetate (CTA) film used as a support for 35 mm photographic elements. This film has been prepared by a conventional solvent-casting process well known to the skilled artisan.

TABLE 1

| Example | Heat-Set Temperature ° C. | Tensile Toughness MPa | Tear Strength g/100 μm | Film Cutting Index |
|---|---|---|---|---|
| 1 | 170 | 44.5 | 15.4 | 1.3 |
| 2 | 175 | 42.6 | 12.0 | 1.2 |
| 3 | 176 | 43.4 | 11.2 | 1.2 |
| 4 | 191 | 52.2 | 14.2 | 1.4 |
| Comparative 1 | 150 | 24.9 | 8.2 | 0.7 |
| Comparative 2 | 204 | 59.4 | 16.2 | 1.6 |
| Comparative 3 | 220 | 71.2 | 21.3 | 2.0 |
| Comparative 4 | 240 | 82.9 | 32.4 | 2.5 |
| Comparative 5 (CTA) | NA | 23 | 25 | 1.0 |

Examples 1 to 4 in Table 1 show that the desired film cutting index (1–1.5) and tensile toughness for EASTAR A150® polyester film base (15–55 MPa) can be achieved by selecting the proper heat-set temperature. Unexpectedly, the desired properties are obtained when the material is heat-set at relatively low temperatures. However, a heat-set temperature that is too low, such as 150° C. used in Comparative Example 1, results in film with very low tear strength and low cutting index. Such a film, while easy to cut and finish, is potentially susceptible to tearing in cameras and photofinishing equipment. Conventionally used heat-set temperatures such as 204° C., 220° C. and 240° C. in Comparative Examples 2, 3 and 4, respectively, result in a film base that is potentially difficult to cut. The preferred cutting index for use in cameras and photofinishing equipment ranges from 1 to 1.5 is obtained only when unusually low heat set temperature is employed. This range is based on the well-established cutting performance of CTA in the photographic industry. In general, films with a cutting index of less than 1 are easily torn during transport in cameras and may be undesirable. Films with a cutting index of greater than 1.5 may be difficult to cut in some photofinishing equipment.

The invention has been described in detail with particular reference to certain preferred embodiments thereof, but it will be understood that variations and modifications can be effected within the spirit and scope of the invention.

What is claimed is:

1. A process for making a biaxially stretched polyester photographic film base comprising the steps of:

(a) casting a molten form of a PET-based polyester material comprising more than 65 mol % of 1,4-cyclohexanedimethanol, based on the total glycol component in the material, onto a casting surface in a machine direction to form a continuous solid sheet, (b) drafting the sheet by stretching in the machine direction at a stretch ratio of from 2 to 4, and at a temperature ranging from 80° C. to 130° C., (c) tentering the sheet in a transverse direction by stretching at a stretch ratio of from 2 to 4, and at a temperature ranging from 80° C. to 130° C., (d) heat-setting the tentered sheet at an actual heat-set temperature in the range of from 160° C. to 191° C., wherein the actual heat-set temperature is determined from a differential scanning calorimetry thermogram of the biaxially-stretched sheet and is represented by the secondary low-temperature melting peak recorded on the thermogram, and, (e) cooling the heat-set sheet to obtain a stretched, heat-set PET-based polyester film having a cutting index of 1 to 1.5 and tensile toughness of 15 to 55 MPa.

2. The process of claim 1 wherein the sheet is stretched in the machine direction at a temperature ranging from 85° C. to 110° C. and in the transverse direction at a temperature ranging from 90° C. to 130° C.

3. The process of claim 1 wherein the actual heat-set temperature is from 160° C. to 180° C.

4. The process of claim 1 wherein the actual heat-set temperature is from 1 60° C. to 176° C.

5. The process of claim 1 wherein no detentering is applied after the heat-setting step.

6. The process of claim 1 wherein the stretch ratio in the machine direction is 2.8 to 3.8 and the stretch ratio in the transverse direction is 2.8 to 3.8.

7. The process of claim 1 wherein the cutting index of the film in step (e) is 1 to 1.3.

8. The process of claim 1, further comprising heat treating the film base at temperatures ranging from Tg-50° C. up to Tg for times ranging from 1 hr to 1000 hrs, where Tg is the glass transition temperature of said material.

9. A film base prepared in accordance with the process of claim 1, wherein the film base comprises a PET-based polyester material in which material:
   a. the level of repeat units derived from 1,4-cyclohexane dimethanol is in the range of from 65 to 100 mol % based on the total glycol component in the material,
   b. the level of repeat units derived from terephthalic acid is in the range of from 70 to 95 mol % based on the total acid component in the material,
   c. the level of repeat units derived from isophthalic acid is in the range of from 5 to 30 mol % based on the total acid component in the material.

10. A film base prepared in accordance with the process of claim 9, wherein the film base comprises a PET-based polyester material in which material:
   a. the level of repeat units derived from 1,4-cyclohexane dimethanol is in the range of from 85 to 100 mol %, based on the total glycol component in the material,
   b. the level of repeat units derived from terephthalic acid is in the range of from 80 to 90 mol %, based on the total acid component in the material,
   c. the level of repeat units derived from isophthalic acid is in the range of from 10 to 20 mol %, based on the total acid component in the material.

11. An imaging element comprising at least one imaging layer and the film base prepared in accordance with the process of claim 1.

12. The imaging element of claim 11 wherein the imaging layer comprises a silver-halide emulsion.

13. The imaging element of claim 11 wherein the light-sensitive imaging layer is sensitive to X-ray exposure or to exposure of emissions from phosphor intensifying screens.

14. The imaging element of claim 11 wherein the element is a photographic film or a photothermographic film.

15. The imaging element of claim 11 wherein the element is a 35 mm photographic film.

16. The imaging element of claim 11 further comprising a photographically acceptable subbing layer and backing layers on the film base.

17. The imaging element of claim 11 wherein the film base bears a magnetic or optical recording layer.

* * * * *